US012804059B2

(12) United States Patent
Ma et al.

(10) Patent No.: US 12,804,059 B2
(45) Date of Patent: Nov. 17, 2026

(54) PROTOCOL DATA UNIT SET SIZE CORRECTION

(71) Applicant: QUALCOMM Incorporated, San Diego, CA (US)

(72) Inventors: Liangping Ma, San Diego, CA (US); Thomas Stockhammer, Bergen (DE); Imed Bouazizi, Frisco, TX (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 18/653,841

(22) Filed: May 2, 2024

(65) Prior Publication Data

US 2025/0343846 A1 Nov. 6, 2025

(51) Int. Cl.
*H04L 69/324* (2022.01)
*H04L 65/65* (2022.01)

(52) U.S. Cl.
CPC ............ *H04L 69/324* (2013.01); *H04L 65/65* (2022.05)

(58) Field of Classification Search
CPC .............................. H04L 69/324; H04L 65/65
See application file for complete search history.

(56) References Cited

U.S. PATENT DOCUMENTS

2023/0361924 A1* 11/2023 Lei ........................ H04L 1/1664
2025/0247742 A1* 7/2025 Löhr ........................ H04L 47/32
2026/0082388 A1* 3/2026 Rao ..................... H04W 72/115

* cited by examiner

*Primary Examiner* — Omar J Ghowrwal
(74) *Attorney, Agent, or Firm* — Holland & Hart LLP

(57) ABSTRACT

Methods, systems, and devices for wireless communications are described. A user equipment (UE) may receive multiple packets of a protocol data unit (PDU) set. The packets may indicate a first PDU set size (PSSize) of the PDU set. The UE may calculate, based on reception of the multiple packets, a second PSSize for the multiple packets of the PDU set and a correction parameter associated with the first PSSize, which is based on the first PSSize and the second PSSize. The UE may transmit a control message indicating a quantized correction parameter associated with the first PSSize based on the correction parameter. In some examples, the correction parameter may be a difference between a ratio of the second PSSize to the first PSSize and one.

19 Claims, 11 Drawing Sheets

PROTOCOL DATA UNIT SET SIZE CORRECTION

FIELD OF TECHNOLOGY

The following relates to wireless communications, including protocol data unit (PDU) set size (PSSize) correction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communication by a user equipment (UE) is described. The method may include receiving a set of multiple packets of a protocol data unit (PDU) set, one or more packets of the set of multiple packets indicating a first PDU set size (PSSize) of the PDU set, calculating, based on reception of the set of multiple packets, a second PSSize for the set of multiple packets of the PDU set and a correction parameter associated with the first PSSize, the correction parameter based on the first PSSize and the second PSSize, and transmitting a control message indicating a quantized correction parameter associated with the first PSSize based on the correction parameter.

A UE for wireless communication is described. The UE may include one or more memories storing processor executable code, and one or more processors coupled with the one or more memories. The one or more processors may individually or collectively be operable to execute the code to cause the UE to receive a set of multiple packets of a PDU set, one or more packets of the set of multiple packets indicating a first PSSize of the PDU set, calculate, based on reception of the set of multiple packets, a second PSSize for the set of multiple packets of the PDU set and a correction parameter associated with the first PSSize, the correction parameter based on the first PSSize and the second PSSize, and transmit a control message indicating a quantized correction parameter associated with the first PSSize based on the correction parameter.

Another UE for wireless communication is described. The UE may include means for receiving a set of multiple packets of a PDU set, one or more packets of the set of multiple packets indicating a first PSSize of the PDU set, means for calculating, based on reception of the set of multiple packets, a second PSSize for the set of multiple packets of the PDU set and a correction parameter associated with the first PSSize, the correction parameter based on the first PSSize and the second PSSize, and means for transmitting a control message indicating a quantized correction parameter associated with the first PSSize based on the correction parameter.

A non-transitory computer-readable medium storing code for wireless communication is described. The code may include instructions executable by one or more processors to receive a set of multiple packets of a PDU set, one or more packets of the set of multiple packets indicating a first PSSize of the PDU set, calculate, based on reception of the set of multiple packets, a second PSSize for the set of multiple packets of the PDU set and a correction parameter associated with the first PSSize, the correction parameter based on the first PSSize and the second PSSize, and transmit a control message indicating a quantized correction parameter associated with the first PSSize based on the correction parameter.

In some examples of the method, UEs, and non-transitory computer-readable medium described herein, the correction parameter indicates a conversion between the first PSSize and the second PSSize.

In some examples of the method, UEs, and non-transitory computer-readable medium described herein, the correction parameter includes a correction ratio that indicates a ratio of the second PSSize to the first PSSize.

In some examples of the method, UEs, and non-transitory computer-readable medium described herein, the correction parameter includes an error ratio that indicates a difference between a ratio of the second PSSize to the first PSSize and one.

Some examples of the method, UEs, and non-transitory computer-readable medium described herein may further include operations, features, means, or instructions for receiving an indication of a frequency parameter associated with transmission of the control message that indicates the quantized correction parameter, where transmitting the control message may be in accordance with the frequency parameter.

In some examples of the method, UEs, and non-transitory computer-readable medium described herein, transmitting the control message may include operations, features, means, or instructions for transmitting the control message to a sender of the PDU set, to a network entity associated with the UE, or both.

In some examples of the method, UEs, and non-transitory computer-readable medium described herein, the control message includes a traffic flow identifier associated with the PDU set and an error range associated with the first PSSize, the error range indicating that the quantized correction parameter satisfies one or more threshold values.

In some examples of the method, UEs, and non-transitory computer-readable medium described herein, the control message includes a first field indicating an identifier of the PDU set or a time parameter associated with calculation of the second PSSize by the UE, a second field indicating the quantized correction parameter, a third field indicating at least a subset of a synchronization source identifier associated with a packet carrying the PDU set, or a combination thereof.

In some examples of the method, UEs, and non-transitory computer-readable medium described herein, transmitting the control message may include operations, features, means, or instructions for transmitting a real time transport control protocol (RTCP) feedback message including a feedback control information field that indicates the quantized correction parameter.

In some examples of the method, UEs, and non-transitory computer-readable medium described herein, transmitting the control message may include operations, features, means, or instructions for transmitting a RTCP application specific message including an application dependent data field that indicates the quantized correction parameter and including a name field that indicates a name associated with the quantized correction parameter.

In some examples of the method, UEs, and non-transitory computer-readable medium described herein, transmitting the control message may include operations, features, means, or instructions for transmitting a RTCP extended report message including a type-specific block contents field that indicates the quantized correction parameter.

In some examples of the method, UEs, and non-transitory computer-readable medium described herein, transmitting the control message may include operations, features, means, or instructions for transmitting a real time transport protocol (RTP) header extension including a field that indicates the quantized correction parameter.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
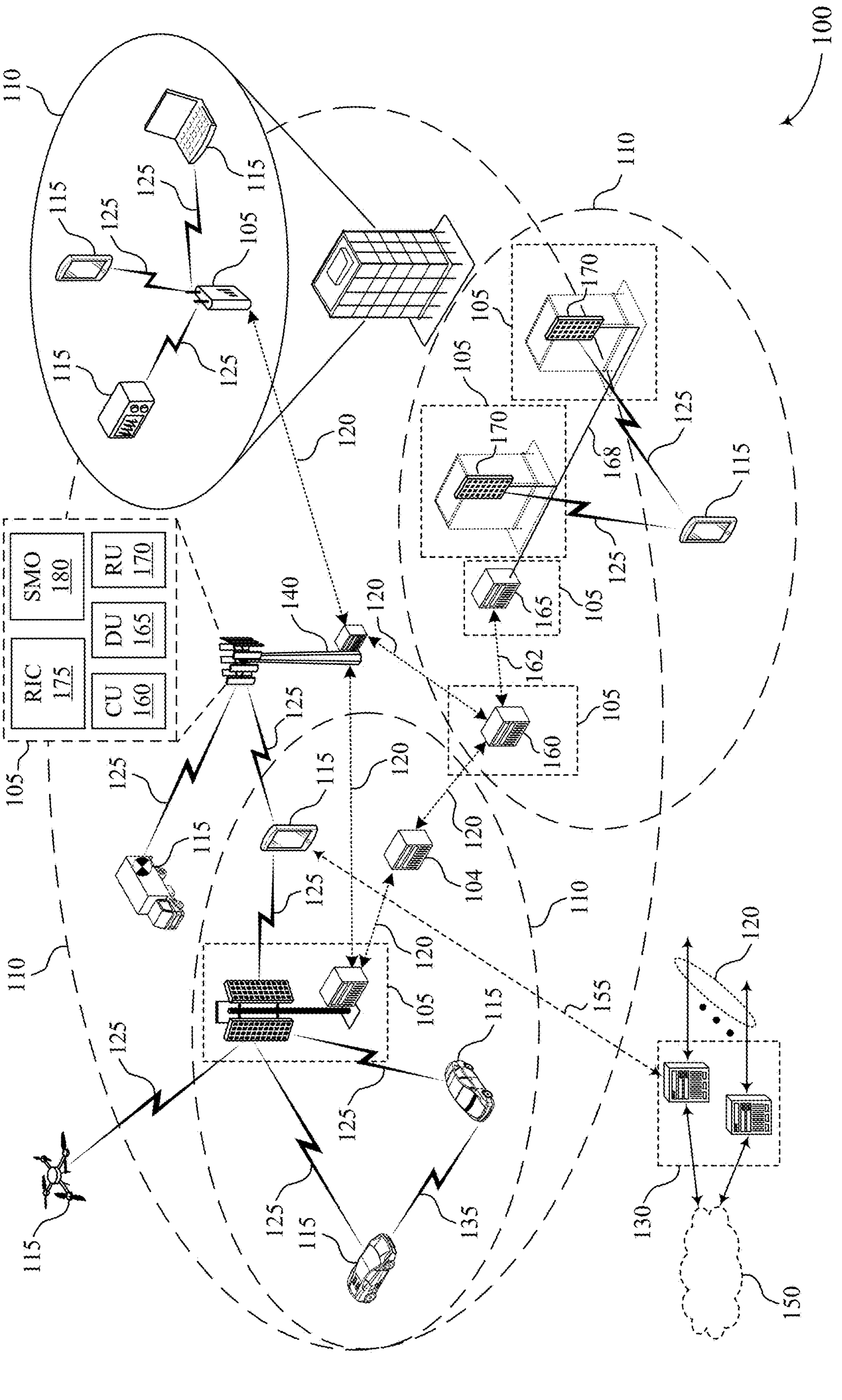
FIG. 1 shows an example of a wireless communications system that supports protocol data unit (PDU) set size (PSSize) correction in accordance with one or more aspects of the present disclosure.

In some wireless communications systems, one or more devices of the wireless communications system (e.g., a user equipment (UE) and a network entity) may exchange media data. In cases where media data is exchanged via a network, media data may be grouped into protocol data unit (PDU) sets. For example, a sending device (e.g., an application server) may generate a PDU set and may send the PDU set to a UE. Each PDU set may correspond to a group of network packets, such as internet protocol (IP) packets. The sending device may calculate a size of the PDU set and may signal (e.g., in a real time transport protocol (RTP) header extension of RTP packets that carry the PDU set) the size of the PDU set to a network entity that performs resource allocation for the UE.

However, due to various factors related to translating and transmitting the PDU set to the UE, there may be an error (e.g., a mismatch) between the signaled PDU set size (PSSize) and an actual size of the PDU set that is observed by the UE. For example, a network may perform modifications to the PDU set (e.g., prior to the PDU set being received at the network entity), may lead to the PSSize that is signaled to the network entity being inaccurate relative to an actual size of the PDU set, which may result in the network entity wasting resources during resource allocation or may result in the network entity providing an insufficient resource allocation. In some examples, a UE may calculate an error associated with the signaled PSSize and indicate the error to the sending device. However, such signaling by the UE may be associated with a high signaling overhead and may have relatively low signaling flexibility.

In accordance with examples described herein, the UE may calculate an error ratio between the signaled PSSize and the observed PSSize and may indicate (e.g., via a control message) a correction parameter associated with the calculated error ratio (e.g., based on a conversion of the observed PSSize to the signaled PSSize). In some examples, the correction parameter may be a difference between the error ratio and one, may be a quantized error ratio based on performing a quantization of the error parameter, or a combination thereof. By indicating the correction of the PSSize (e.g., to a sender of the PDU set, such as an application server), the UE may support more efficient utilization of resources by enabling a more accurate awareness of PSSize by a network entity that schedules resources for the UE. For example, with an awareness of the PSSize, the network entity may perform accurate resource allocation that prevents resource waste and supports increased spectral efficiency and reduced power consumption. By signaling the correction parameter which converts the signaled PSSize to the actual PSSize, the UE may support a reduced signaling overhead, which may support reduced power consumption by the UE and more efficient utilization of processing resources.

Aspects of the disclosure are initially described in the context of wireless communications systems. Aspects of the disclosure are further described in the context of process flows and signaling diagrams. Aspects of the disclosure are further illustrated by and described with reference to apparatus diagrams, system diagrams, and flowcharts that relate to PSSize correction.

FIG. 1 shows an example of a wireless communications system 100 that supports PSSize correction in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The core network 130 may be a 5G network, a 6G network, or other radio access network (RAN). A protocol data unit (PDU) set represents one or more PDUs each carrying a payload of a unit of information generated at the application level. Thus, for example, a PDU may include a frame of video data, a slice of a frame of video data, audio data, computer graphics data, or other media data for an extended reality (XR) service.

When two (or more) devices (e.g., UEs 115, network entities 105) are engaged in an XR session, one device may send a PSSize to another device, where the PSSize may represent the total size of all PDUs of the PDU Set to which a particular PDU belongs, including RTP/user datagram protocol (UDP)/IP header encapsulation overhead of the corresponding PDUs. An RTP sender may compute the PSSize value and include the PSSize value in an RTP header extension of an RTP packet sent to the RTP receiver. However, the IP address version (e.g., IPv4 or IPv6) used by the RTP sender locally to generate the IP packets encapsulating the RTP (and/or, in some cases, UDP) packets may be different from the IP version sent to a user plane function (UPF) device, due to network tunneling (e.g., IPv4-v6 tunneling, carrier grade network address translation (CG-NAT), or network address translation-protocol translation (NAT-PT)), IP fragmentation or other such issues.

In accordance with examples described herein, a UE 115 may calculate an error ratio between a signaled PSSize and an observed PSSize and may indicate (e.g., via a control message) a correction parameter associated with the calculated error ratio (e.g., based on a conversion of the observed PSSize to the signaled PSSize). In some examples, the correction parameter may be a difference between the error ratio and one, may be a quantized error ratio based on performing a quantization of the error parameter, or a combination thereof. By indicating the correction of the PSSize (e.g., to a sender of the PDU set, such as an application server), the UE 115 may support more efficient utilization of resources by enabling a more accurate awareness of PSSize by a network entity 105 that schedules resources for the UE 115. For example, with an awareness of the PSSize, the network entity 105 may perform accurate resource allocation that prevents resource waste and supports increased spectral efficiency and reduced power consumption. By signaling the correction parameter which converts the signaled PSSize to the actual PSSize, the UE 115 may support a reduced signaling overhead, which may support reduced power consumption by the UE and more efficient utilization of processing resources.

Figure 2:
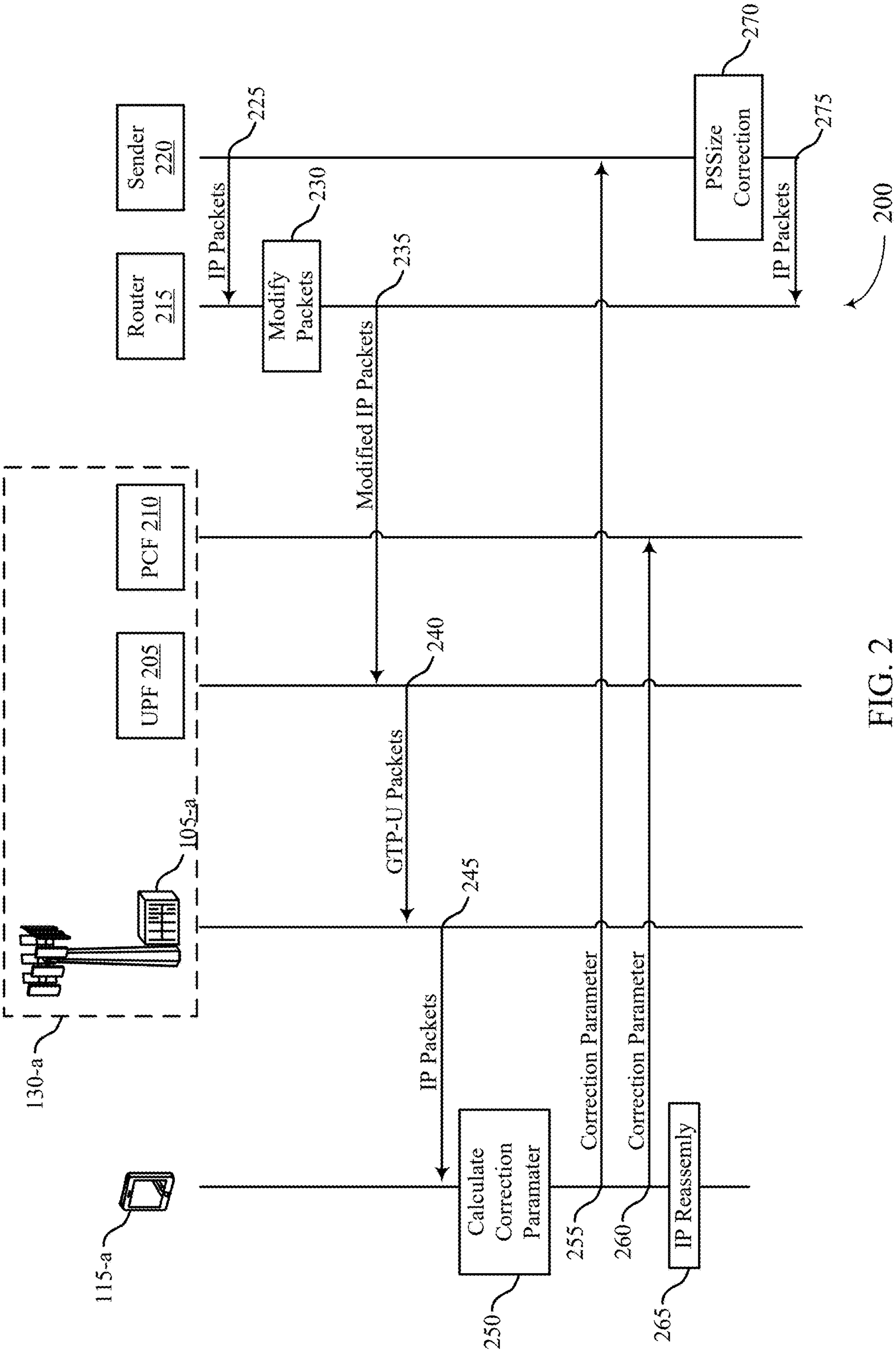
FIG. 2 shows an example of a process flow that supports PSSize correction in accordance with one or more aspects of the present disclosure.

FIG. 2 shows an example of a process flow 200 that supports PSSize correction in accordance with one or more aspects of the present disclosure. The process flow 200 may implement or may be implemented by aspects of the wireless communications system 100. For example, the process flow 200 may include a UE 115-*a,* a network entity 105-*a,* and a core network 130-*a,* which may be examples of corresponding devices or networks described herein.

In the following description of process flow 200, the operations may be performed in a different order than the order shown, or other operations may be added or removed from the process flow 200. For example, some operations may also be left out of process flow 200, may be performed in different orders or at different times, or other operations may be added to process flow 200. Although communications of the process flow 200 are shown occurring between a UE 115-*a,* a network entity 105-*a,* a user plane function 205, a policy control function 210, a router 215, and a sender 220, some aspects of some operations may also be performed by one or more other wireless devices, network devices, or network functions.

At 225, a sender 220 of a PDU set may transmit IP packets to a router 215. The sender 220 may be an application server, another UE 115, or a network entity 105, among other examples. The IP packets may include packets of media data. In some examples, the sender 220 (e.g., a source device) may generate a PSSize value (e.g., a first PSSize) and may include the PSSize value in an RTP header extension of packets (e.g., RTP packets, IP packets) carrying media data of the PDU Set. In this manner, the PSSize information may be passed to the router 215. The PSSize value may be based on sizes of IP packet headers, which may vary based on IP packet type (e.g., IPv4 uses IP packet headers of 20 bytes, whereas IPv6 uses IP packet headers of 40 bytes).

At 230, the router 215 may perform network operations that change the PSSize of the IP packets. For example, certain issues may arise along a network route/path that may render the generated PSSize value (e.g., by the sender 220 at 225) inaccurate. In some examples, network address translation (NAT), e.g., per NAT46/NAT64, and IP fragmentation may cause changes to received packets that render the initially calculated PSSize value inaccurate at the destination device. In NAT46, for example, an incoming IP packet with IPV4 address is converted to an IP packet with IPv6 address, which results in a change in the total packet size because of the difference in the size of the IP packet header between IPV4 and IPV6. NAT64 is effectively the same issue in reverse. In some examples, the router 215 may perform IP fragmentation (e.g., when a maximum transmission unit (MTU) size of a network link does not support sizes of the packets), and fragmenting the IP packets may change the PSSize. For example, for each IP packet that is added to the quantity of IP packets during IP packet fragmentation, an additional IP header occupying additional size may be added to the PSSize. In some examples, a traversal using relays around network address translation (NAT) (TURN) server may add a session traversal utilities for NAT (STUN) header, a STUN attribute, a transport address, or a combination thereof to the PDU set, increasing the PSSize.

At 235, the router 215 may send the modified IP packets (e.g., fragmented IP packets, IP Packets converted to different IP versions) to the UPF 205 of the core network 130-*a.* The UPF 205 may encapsulate the IP packets (e.g., using general packet radio service (GPRS) tunneling protocol-user plane (GTP-U) encapsulation).

At 240, the UPF 205 may transmit the encapsulated modified IP packets to the network entity 105-*a* (e.g., a gNB). The network entity 105-*a* may decapsulate the packets and may allocate resources (e.g., time, frequency, spatial domain) for the PDU set (e.g., a resource allocation for the UE 115-*a*) based on the PSSize that is indicated by the RTP headers of the packets that carry the PDUs of the PDU set.

At 245, the UE 115-*a* may receive multiple packets of a PDU set. One or more packets of the PDU set may indicate a first PSSize of the PDU set. For example, the network entity 105-*a* may send the modified IP packets to the UE 115-*a,* and an RTP header of one or more of the modified IP packets may carry a PSSize field that indicates the first PSSize of the PDU set. The network entity 105-*a* (e.g., of the core network 130-*a*) may be communicatively coupled with the UE 115-*a* (e.g., a PDU set destination device), for scheduling over-the-air transmissions.

At 250, the UE 115-*a* may calculate, based on reception of the multiple packets of the PDU set, a second PSSize for the multiple packets of the PDU set. That is, the UE 115-*a* may calculate a cumulative actual size of the received packets for the PDU set (e.g., a PSSize observed by the UE) based on adding the sizes of the received packets. The UE 115-*a* may calculate a correction parameter associated with the first PSSize (e.g., the PSSize signaled via the RTP header). For example, the UE 115-*a* may calculate a correction ratio (e.g., r) which indicates a ratio of the second PSSize (e.g., the actual size of the received IP packets observed by the UE 115-*a*) to the first PSSize (e.g., the PSSize that is indicated by the IP packets via the RTP header. In some examples, the UE 115-*a* may calculate an error ratio which indicates a difference between the correction ratio and one (e.g., d1=r−1). In some examples, the UE 115-*a* may quantize (e.g., based on one or more quantization procedures or quantization parameters) the error ratio, the correction ratio, or both (e.g., quantize d1:d2=Quantize(d1)), and the correction parameter may include the quantized error ratio or correction ratio. In some cases, quantization may refer to selecting a value from a set of multiple different values that is closest.

At 255, the UE 115-*a* may transmit, via a control message, an indication of the correction parameter to the sender 220 (e.g., transmit a signal that indicates d2). The control message may be a session description protocol (SDP) message, an RTCP message (e.g., an RTCP feedback message, an RTCP application specific message, an RTCP extended report message), an RTCP transport layer feedback message, an RTCP payload specific feedback message, an RTCP application layer feedback message, RTCP application specific message, an RTCP extended report, an RTP header extension, or some other signaling. Additionally, or alternatively, at 260, the UE 115-*a* may transmit the indication of the correction parameter to the network entity 105-*a.* In such cases, the indication of the correction parameter to the network entity 105-*a* may be via a radio resource control (RRC) or medium access control-control element (MAC-CE) message. In some cases, an indication of the correction parameter may be the value of the error ratio d1, the value represented by a quantized dl (e.g., d2) relative to a range, or both. In an example, the receiver (e.g., UE 115-*a*) may send a range of the correction ratio, or the error ratio, or both, to the network entity 105-*a* (e.g., gNB), in an RRC or MAC CE message. In another example, the receiver (e.g., UE 115-*a*) may send the control message that indicates a range of the correction ratio, or the error ratio, or both, to the AF, which forwards the information to the core network (e.g., PCF 210), which then sends the information to the network entity 105-*a* (e.g., gNB), or sends the information to the UPF 205 which corrects the information by adjusting the PSSize in the GTP-U packet header of a GTP-U packet that encapsulates a media-carrying RTP packets and which then sends the GTP-U packet to the network entity 105-*a* (e.g., gNB). In some examples, the control message may contain an identifier of the traffic flow (e.g., IP 5-tuple, QoS flow identifier (QFI), a stream identifier (e.g., SSRC of the source of the PDU Set)), a range of the correction ratio or the error ratio or both, where the range may be a defined value (e.g., maximum value) of the correction ratio or the error ratio or both. The network entity 105-*a* (e.g., gNB) may use the received corrected PSSize or locally corrected PSSize for resource allocation.

In some cases, the control message may be an SDP message and an attribute may be included in the SDP message to indicate the correction parameter. In some examples, the attribute may indicate a correction ratio (e.g., a=pssize-correction-ratio <correction-ratio>), and the correction ratio may be a positive decimal number with one unit digit and four fractional digits (e.g., 1.0002). In some examples, the attribute may indicate an error ration (e.g., a=pssize-error-ratio <error-ratio>), and the error ratio may be a signed decimal number with one unit digit and four fractional digits (e.g., −0.0002).

In some examples, the UE 115-*a* may transmit the control message in accordance with a frequency (e.g., a periodicity, such as once per second, once per 100 PDU sets, etc.). For example, the UE 115-*a* may receive an indication of a frequency parameter associated with transmission of the control message that indicates the correction parameter. The frequency parameter may be indicated in a configuration from the network entity 105-*a* (e.g., via the PCF 210 and the AF of the core network 130-*a*). Additionally, or alternatively, the frequency parameter may be negotiated (e.g., indicated, signaled) during session setup (e.g., via an SDP message from the network entity 105-*a*).

In some examples, the correction parameter may be indicated based on the correction parameter satisfying one or more thresholds. For example, the UE 115-*a* may determine whether the correction parameter exceeds a threshold error range (e.g., [−0.5, +0.5]) and may transmit the indication of the correction parameter based on the correction parameter exceeding the threshold error range. In cases where the correction parameter falls within the threshold error range (e.g., an acceptable error range), the UE 115-*a* may refrain from transmitting the indication of the correction parameter. Additionally, or alternatively, the UE 115-*a* may signal the indication of the correction parameter such that an overhead of the correction parameter within a message that carries the correction parameter satisfies a threshold overhead. That is, the UE 115-*a* may determine that the indication of the correction parameter occupies a threshold overhead of the control message (e.g., overhead does not exceed 5% of an amount of data packets in bytes associated with the control message).

In some examples, such as when sending to the network (e.g., the PCF), the control message may include a traffic flow identifier (e.g., IP 5-tuple, quality of service (QoS) flow identifier (QFI), stream identifier, synchronization source (SSRC) of the source device or sender of the PDU set) associated with the PDU set and an error range associated with the first PSSize (e.g., the signaled PSSize via the RTP header). The error range may indicate that the correction parameter (e.g., correction ratio, error ratio, quantized correction parameter) satisfies one or more threshold values (e.g., that the error ratio or the correction ratio satisfies a maximum value). For example, the UE 115-*a* (e.g., the receiver) may send the control message that indicates the correction ratio or the error ratio along with session information, such as an IP 5-tuple to the network (e.g., the PCF) to update a Protocol Description, such as, for example, via an AF to PCF in a 5G core network. In some cases, the core network may correct the PSSize (e.g., PCF configures SMF which in turn configures UPF which corrects the PSSize carried in the RTP header extension for PDU Set marking).

At 265, the UE 115-*a* may perform IP reassembly of the IP packets (e.g., fragmented packets) and may process the packets for presentation (e.g., extract the RTP packet and RTP payload, decode and render the media data in the payload).

At 270, in response to receiving the correction parameter, the sender 220 may perform correction (e.g., pre-compensation) for a subsequent PDU set. That is, the sender 220 may calculate an initial PSSize for the PDU set and multiply the initial PSSize by a correction ratio that is derived from the correction parameter to determine an updated (e.g., corrected) PSSize (e.g., signaled PSSize) that the sender 220 includes (e.g., indicates) in the RTP header extension for a subsequent PDU set. To derive the correction ratio from the indicated correction parameter, the sender 220 may inverse quantize the correction parameter (e.g., Calculate d1_est=inverseQuantize(d2)) to obtain an estimate of the error ratio (e.g., d1_est=r−1). The sender 220 may calculate the correction ratio (e.g., an estimated correction ratio) based on adding one to the estimated error ratio (e.g., calculate r_est=(1+d1_est)). The sender 220 may correct the initial calculation (e.g., local calculation) of the PSSize to be signaled (e.g., included in an RTP header) of the subsequent PDU set (e.g., correct by multiplying r_est by locally derived PSSize).

At 275, the sender 220 may transmit the subsequent PDU set (e.g., subsequent set of IP packets) to the router 215, which may forward the PDU set to the network entity 105-*a*, and the network entity may determine the updated (e.g., corrected) PSSize based on the indicated value of the PSSize in the RTP header extension of the subsequent PDU set. In cases where the network entity 105-*a* receives the indication of the correction parameter, the network entity 105-*a* may perform the correction of the PSSize itself. The network entity 105-*a* may perform resource allocation for the UE 115-*a* in accordance with the updated (e.g., corrected) PSSize, which may be corrected locally at the network entity 105-*a* or may be received via an RTP header of one or more packets received from the router 215.

Figure 3:
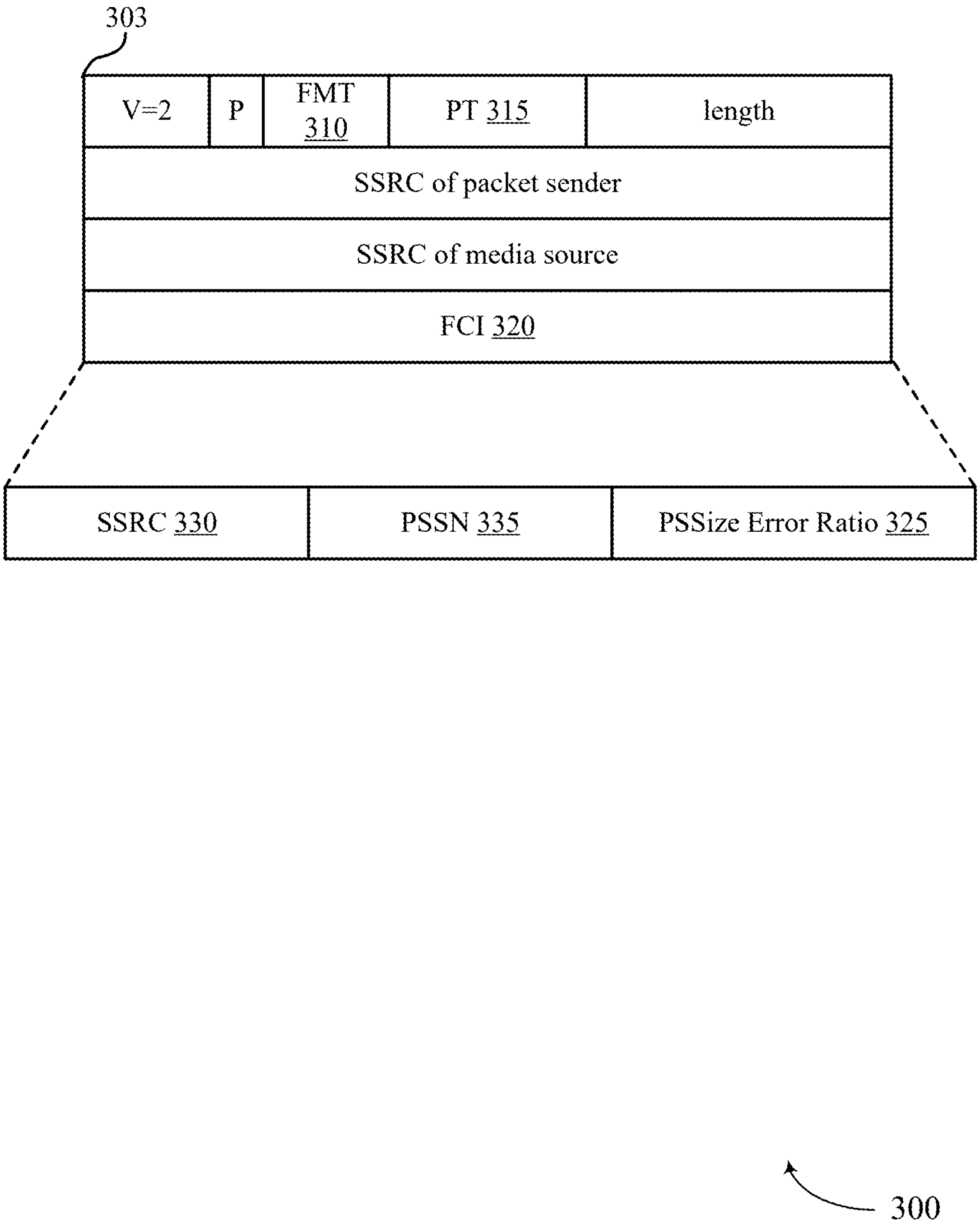
FIGS. 3-6B show examples of signaling diagrams that support PSSize correction in accordance with one or more aspects of the present disclosure.

FIG. 3 shows an example of a signaling diagram 300 that supports PSSize correction in accordance with one or more aspects of the present disclosure. The signaling diagram 300 may implement or may be implemented by aspects of the wireless communications system 100 or the process flow 200. For example, the signaling diagram 300 may illustrate signaling to be included in an indication of a correction parameter by a UE 115-*a*, which may be included in one or more steps of the process flow 200 (e.g., 255, 260).

The signaling diagram 300 may include an RTCP feedback message 303 that includes a feedback message type (FMT) 310, a payload type (PT) 315, and feedback control information (FCI) 320. The FMT 310 and the PT 315 may be used together to identify a type of the RTCP feedback message 303, and the FCI 320 may carry other (e.g., remaining) information for the RTCP feedback message 303. The PT 315 may indicate information about the payload of the RTCP feedback message 303, including whether the RTCP feedback message 303 is one of a transport layer feedback message (e.g., an RTP feedback message (RTPFB)) type or a payload specific feedback message (PSFB) type.

To indicate that the RTCP feedback message 303 indicates a PSSize correction parameter (e.g., as described in greater detail with reference to FIG. 2), the RTCP feedback message 303 may indicate one of a set of combinations of FMT 310 and PT 315 (e.g., PT=RTPFB=205 and FMT=2, PT=PSFB=206 and FMT=4, PT-PSFB=206 and FMT=15). The combination of FMT 310 and PT 315 for the RTCP feedback message 303 that indicates the PSSize correction parameter may differentiate the RTCP feedback message 303 from one or more other RTCP feedback message types (e.g., generic ACK, picture loss indication (PLI), slice loss indication (SLI), reference picture selection indication (RPSI), and application layer FB message, among other examples).

In an example, when PT=RTPFB=205 and FMT=2, the FCI may carry at least two fields (1) an identifier that identifies the PDU Set or the time instant at which the error ratio is calculated (e.g., PDU Set Sequence number (PSSN) or a timestamp, respectively) and (2) the PSSize Error Ratio. The FCI 320 may include a PSSize (PSSize) error ratio field 325 that indicates a correction parameter for a PSSize that is indicated to the UE (e.g., via an RTP header), as described in greater detail with reference to FIG. 2. The correction parameter may be indicated in a twos complement representation. Additionally, or alternatively, the FCI 320 may include a PDU set sequence number (PSSN) field 335 indicating an identifier of the PDU set (e.g., for which the PSSize error ratio field 325 applies) or a time parameter associated with calculation of the PSSize (e.g., actual PSSize) by the UE (e.g., a timestamp). Additionally, or alternatively, the FCI 320 may include an SSRC field 330 that indicates at least a subset (e.g., last 10 digits) of a SSRC identifier associated with a packet that carries the PDU set (e.g., the PDU set for which an PSSize error ratio field 325 applies). For example, the FCI may include the last 10 digits of the SSRC, the PSSN is 10 bits, and the PSSize Error Ratio: 12 bits, in two's complement representation. Other example combination include PT=PSFB=206 and FMT=4, where the FCI may also at least two fields as discussed herein. A further example combination includes, PT=PSFB=206 and FMT=15, where the FCI may also at least two fields as discussed herein.

In some examples, an augmented Backus-Naur form (ABNF) syntax for SDP signaling may be added to support the RTCP feedback message 303 that indicates the PSSize correction parameter. For example, the ABNF syntax may be updated to include "rtcp-fb-ack-param"=SP "pssize-error-ratio" or may updated to include "rtcp-fb-nack-param"=SP "pssize-error-ratio", or both.

Figure 4:
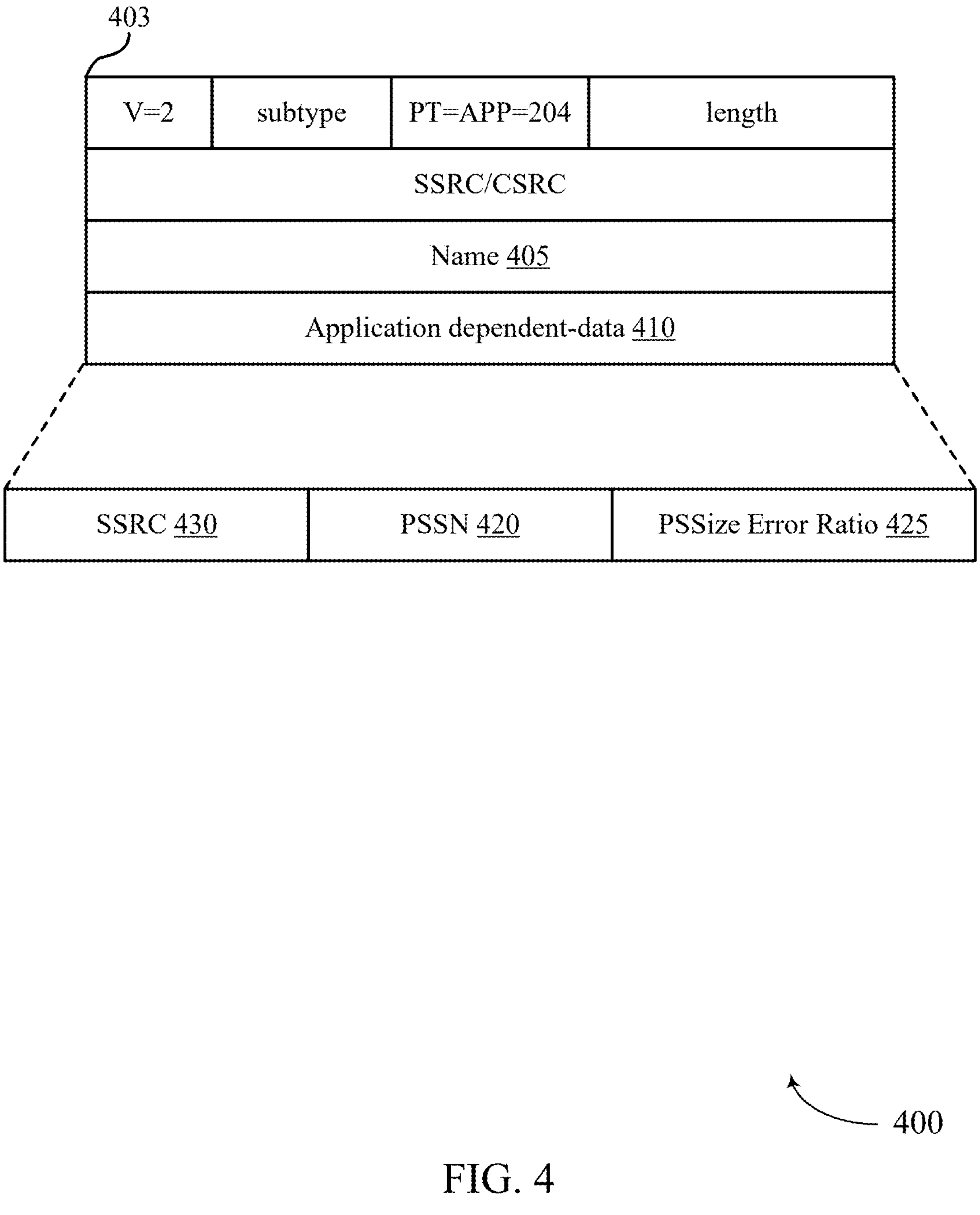

FIG. 4 shows an example of a signaling diagram 400 that supports PSSize correction in accordance with one or more aspects of the present disclosure. The signaling diagram 400 may implement or may be implemented by aspects of the wireless communications system 100 or the process flow 200. For example, the signaling diagram 40 may illustrate signaling to be included in an indication of a correction parameter by a UE 115-*a*, which may be included in one or more steps of the process flow 200 (e.g., 255, 260).

The signaling diagram 400 may include an RTCP application specific message 403 that includes a name field 405 and an application dependent data field 410. The name field 405 may indicate a name value (e.g., 3PER (3GPP PSSize Error Ratio), any other unique name value differentiating the RTCP application specific message 403 from other RTCP application specific messages or from other applications) that the RTCP application specific message 403 indicates a PSSize correction parameter, as described in greater detail with reference to FIG. 2.

The application dependent data field 410 may include a PSSize (PSSize) error ratio field 425 that indicates a correction parameter for a PSSize that is indicated to the UE (e.g., via an RTP header), as described in greater detail with reference to FIG. 2. The correction parameter may be indicated in a twos complement representation. Additionally, or alternatively, the application dependent data field 410 may include a PSSN field 420 indicating an identifier of the PDU set (e.g., for which the PSSize error ratio field 425 applies) or a time parameter associated with calculation of the PSSize (e.g., actual PSSize) by the UE (e.g., a timestamp). Additionally, or alternatively, the application dependent data field 410 may include an SSRC field 430 that indicates at least a subset (e.g., last 10 digits) of a SSRC identifier associated with a packet that carries the PDU set (e.g., the PDU set for which the PSSize error ratio field 425 applies).

In some examples, an augmented Backus-Naur form (ABNF) syntax for SDP signaling may be added to support the RTCP application specific message 403 that indicates the PSSize correction parameter. For example, the ABNF syntax may be updated to include an attribute (e.g., a=3gpp_pssize_error_ratio).

Figure 5:
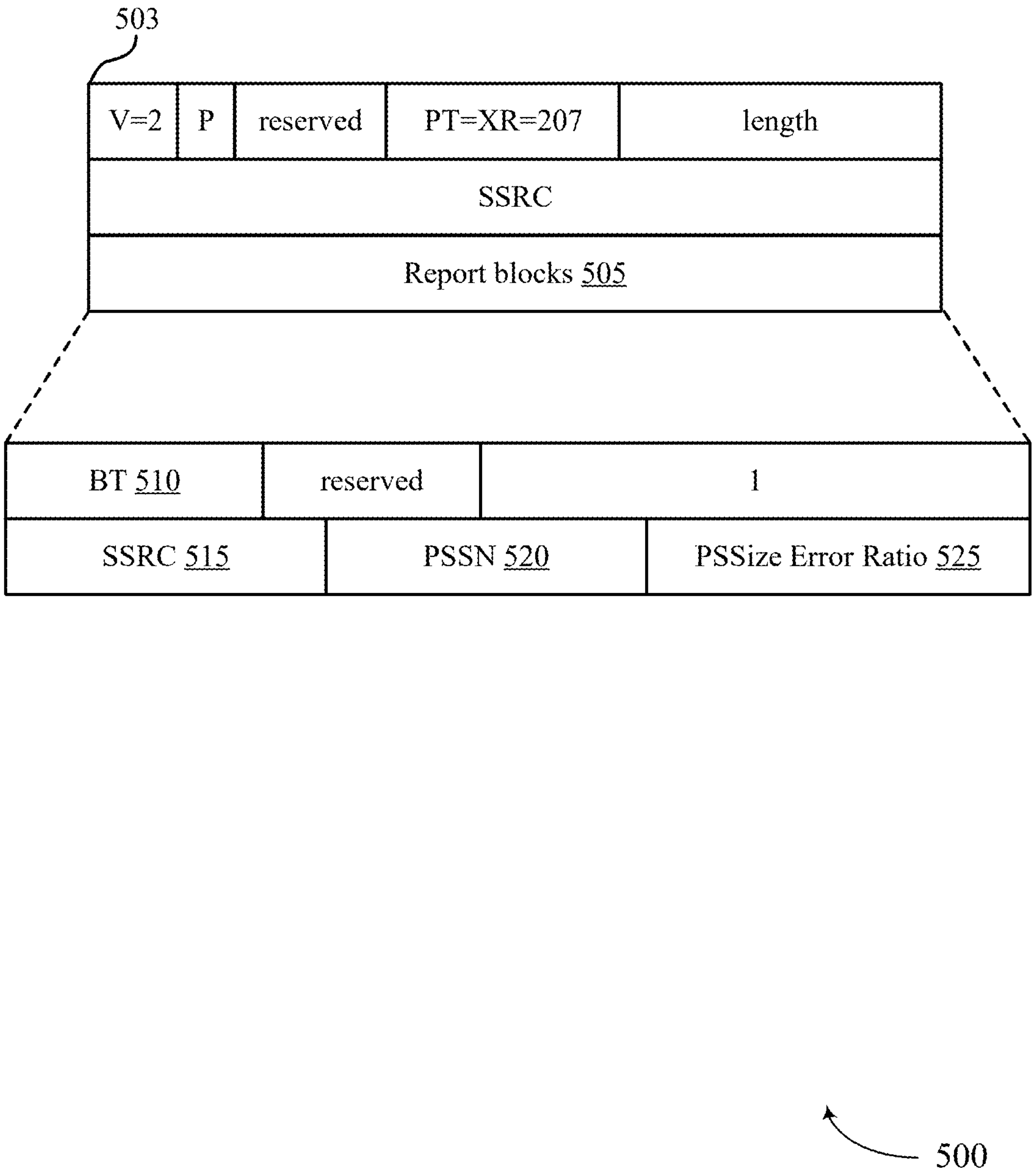

FIG. 5 shows an example of a signaling diagram 500 that supports PSSize correction in accordance with one or more aspects of the present disclosure. The signaling diagram 500 may implement or may be implemented by aspects of the wireless communications system 100 or the process flow 200. For example, the signaling diagram 500 may illustrate signaling to be included in an indication of a correction parameter by a UE 115-*a*, which may be included in one or more steps of the process flow 200 (e.g., 255, 260).

The signaling diagram 500 may include an RTCP extended report message 503 that includes a report blocks field 505. The report blocks field 505 may include a block type (BT) 510, and a value of the BIT 510 (e.g., any unique value differentiating the RTCP extended report message 503 from other RTCP extended report messages or other extended report blocks) that the RTCP extended report message 503 indicates a PSSize correction parameter, as described in greater detail with reference to FIG. 2. The reports blocks field 505 may include a type-specific field left as reserved bits and a type-specific block contents field.

The type-specific block contents field of the report blocks field 505 may include a PSSize (PSSize) error ratio field 525 that indicates a correction parameter for a PSSize that is indicated to the UE (e.g., via an RTP header), as described in greater detail with reference to FIG. 2. The correction parameter may be indicated in a twos complement representation. Additionally, or alternatively, the type-specific block contents field may include a PSSN field 520 indicating an identifier of the PDU set (e.g., for which the PSSize error ratio field 525 applies) or a time parameter associated with calculation of the PSSize (e.g., actual PSSize) by the UE (e.g., a timestamp). Additionally, or alternatively, the type-specific block contents field may include an SSRC field 515 that indicates at least a subset (e.g., last 10 digits) of a SSRC identifier associated with a packet that carries the PDU set (e.g., the PDU set for which the PSSize error ratio field 525 applies).

In some examples, an augmented Backus-Naur form (ABNF) syntax for SDP signaling may be added to support the RTCP extended report message 503 that indicates the PSSize correction parameter. For example, the ABNF syntax may be updated to indicate that an XR format can include the PSSize correction parameter (e.g., xr-format=pssize-error-ratio).

Figure 6A:
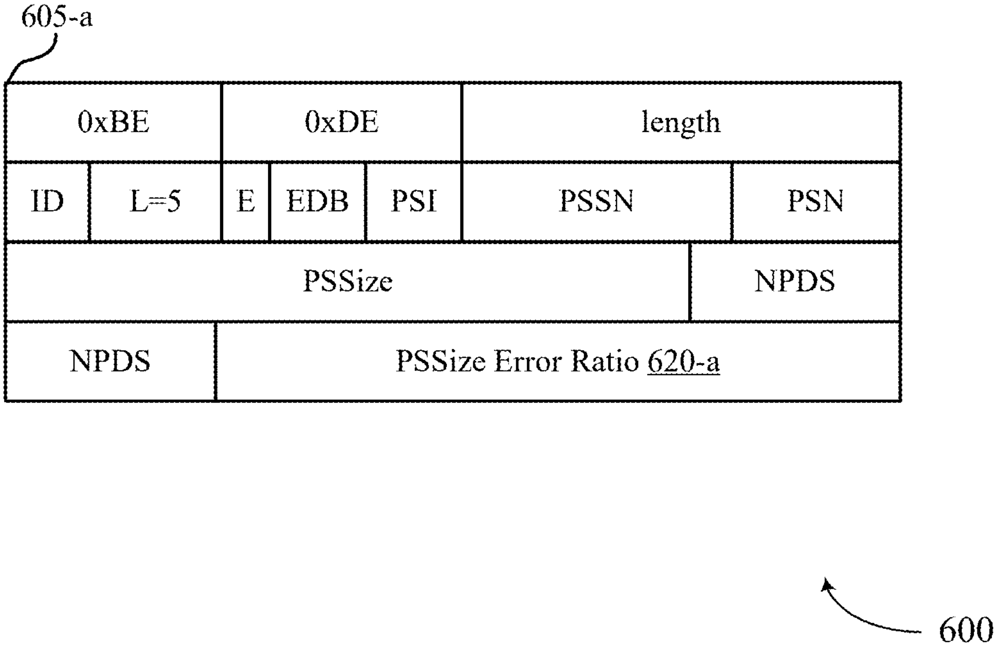
Figure 6B:
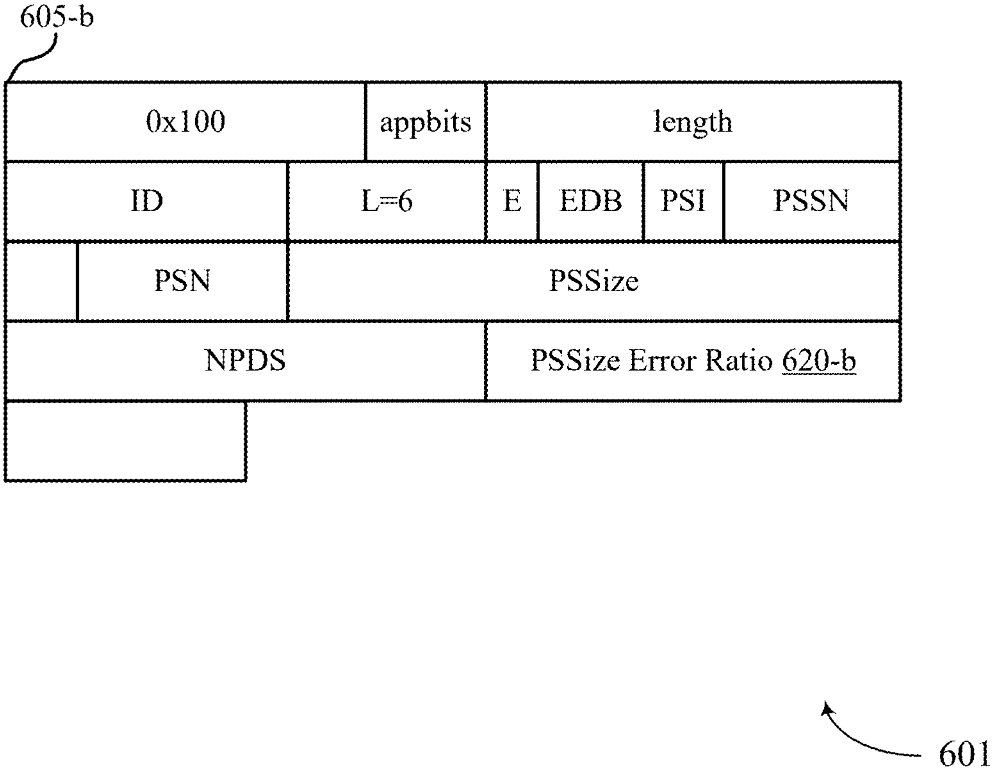

FIGS. 6A and 6B show examples of a signaling diagram 600 and a signaling diagram 301 that support PSSize correction in accordance with one or more aspects of the present disclosure. The signaling diagram 600 and the signaling diagram 601 may implement or may be implemented by aspects of the wireless communications system 100 or the process flow 200. For example, the signaling diagram 600 and the signaling diagram 601 may illustrate signaling to be included in an indication of a correction parameter by a UE 115-*a,* which may be included in one or more steps of the process flow 200 (e.g., 255, 260).

The signaling diagram 600 may include an RTP header extension 605-*a* in accordance with a one-byte format of the RTP header extension 605-*a* and the signaling diagram 601 may include an RTP header extension 605-*b* in accordance with a two-byte format of the RTP header extension 605-*b*.

The RTP header extension 605-*a* and the header extension 605-*b* may include a new field, a PSSize error ratio field 620-*a* or a PSSize error ratio field 620-*b,* respectively. The PSSize error ratio field 620-*a* and the PSSize error ratio field 620-*b* may each indicate a correction parameter for a PSSize that is indicated to the UE (e.g., via an RTP header), as described in greater detail with reference to FIG. 2. The correction parameter may be indicated in a twos complement representation. Additionally, or alternatively, the PSSize error ratio field 620-*a* and the PSSize error ratio field 620-*b* may each indicate an identifier (e.g., PSSN) of the PDU set (e.g., for which the PSSize error ratio field 525 applies) or a time parameter associated with calculation of the PSSize (e.g., actual PSSize) by the UE (e.g., a timestamp). Additionally, or alternatively, the PSSize error ratio field 620-*a* and the PSSize error ratio field 620-*b* may each indicate at least a subset (e.g., last 10 digits) of a SSRC identifier associated with a packet that carries the PDU set (e.g., the PDU set for which the PSSize error ratio field 525 applies). In an example, a PSSizeErrorRatio may be a last 10 bits of the PSSN, a last 4 bits of the SSRC, and 10 bits to represent the PSSize Error Ratio, of the RTP header extension 605-*a,* the header extension 605-*b*.

In some examples, an augmented Backus-Naur form (ABNF) syntax for SDP signaling may be added to support the RTP header extension 605-*a,* the header extension 605-*b,* or both, that indicate the PSSize correction parameter. For example, the ABNF syntax may be updated to include an extmap attribute that indicates the RTP header extension 605-*a* and/or the RTP header extension 605-*b* (e.g., extensionname="urn:3 gppLpssize-error-ratio:rel-19").

Figure 7:
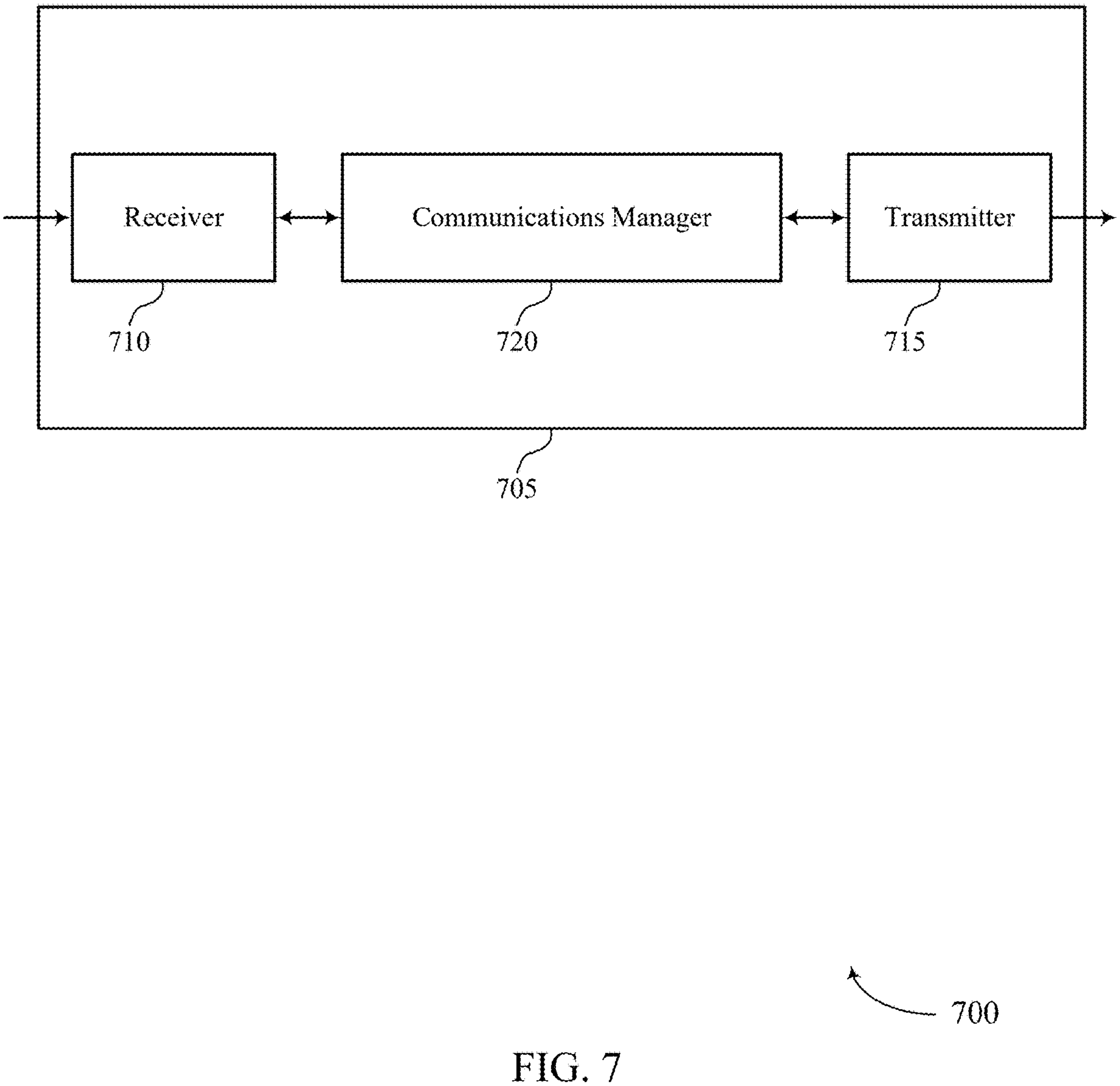
FIGS. 7 and 8 show block diagrams of devices that support PSSize correction in accordance with one or more aspects of the present disclosure.

FIG. 7 shows a block diagram 700 of a device 705 that supports PSSize correction in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to PSSize correction). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to PSSize correction). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of PSSize correction as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 is capable of, configured to, or operable to support a means for receiving a set of multiple packets of a PDU set, one or more packets of the set of multiple packets indicating a first PSSize of the PDU set. The communications manager 720 is capable of, configured to, or operable to support a means for calculating, based on reception of the set of multiple packets, a second PSSize for the set of multiple packets of the PDU set and a correction parameter associated with the first PSSize, the correction parameter based on the first PSSize and the second PSSize. The communications manager 720 is capable of, configured to, or operable to support a means for transmitting a control message indicating a quantized correction parameter associated with the first PSSize based on the correction parameter.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing and reduced power consumption.

Figure 8:
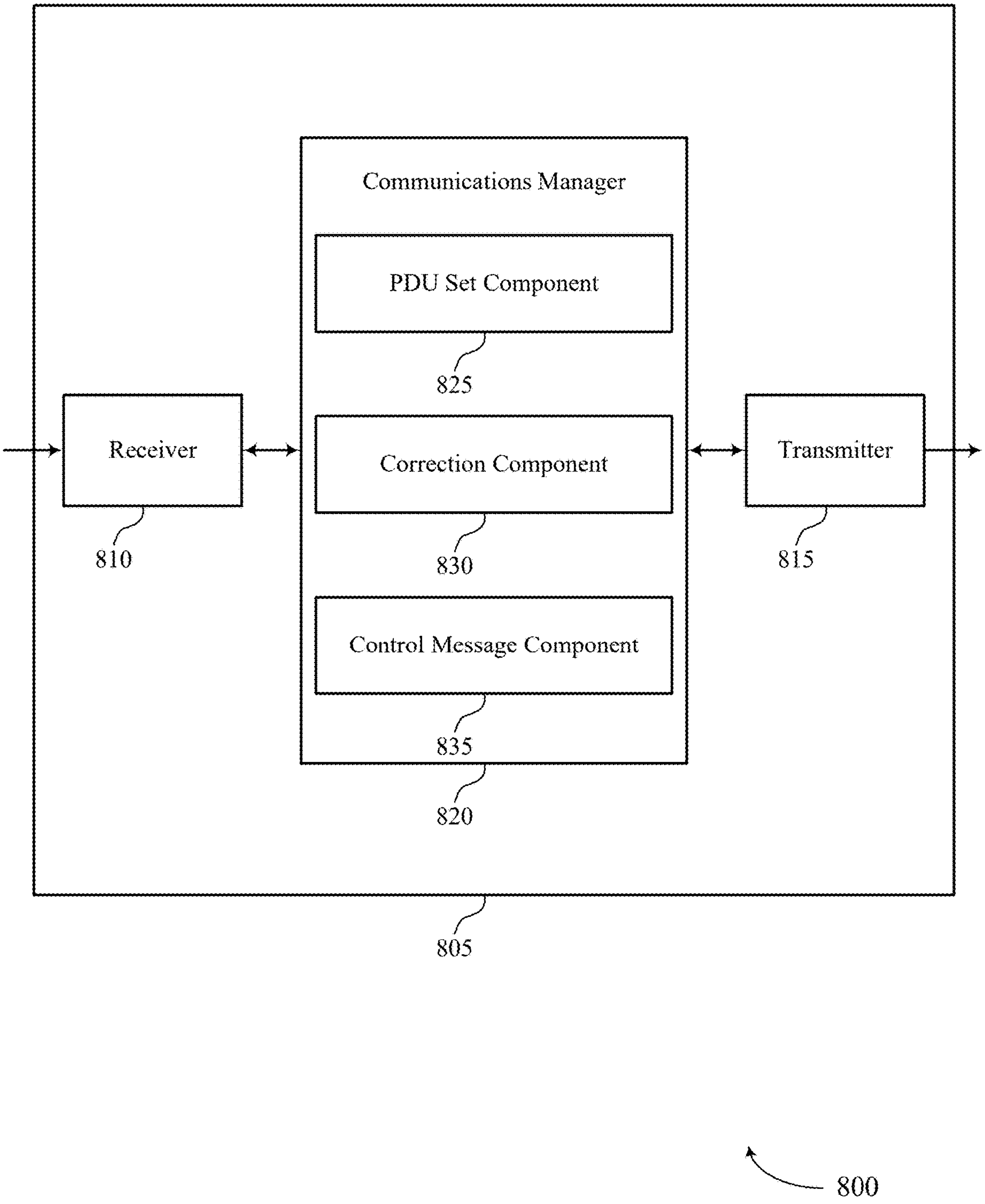

FIG. 8 shows a block diagram 800 of a device 805 that supports PSSize correction in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to PSSize correction). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PSSize correction). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of PSSize correction as described herein. For example, the communications manager 820 may include a PDU set component 825, a correction component 830, a control message component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The PDU set component 825 is capable of, configured to, or operable to support a means for receiving a set of multiple packets of a PDU set, one or more packets of the set of multiple packets indicating a first PSSize of the PDU set. The correction component 830 is capable of, configured to, or operable to support a means for calculating, based on reception of the set of multiple packets, a second PSSize for the set of multiple packets of the PDU set and a correction parameter associated with the first PSSize, the correction parameter based on the first PSSize and the second PSSize. The control message component 835 is capable of, configured to, or operable to support a means for transmitting a control message indicating a quantized correction parameter associated with the first PSSize based on the correction parameter.

Figure 9:
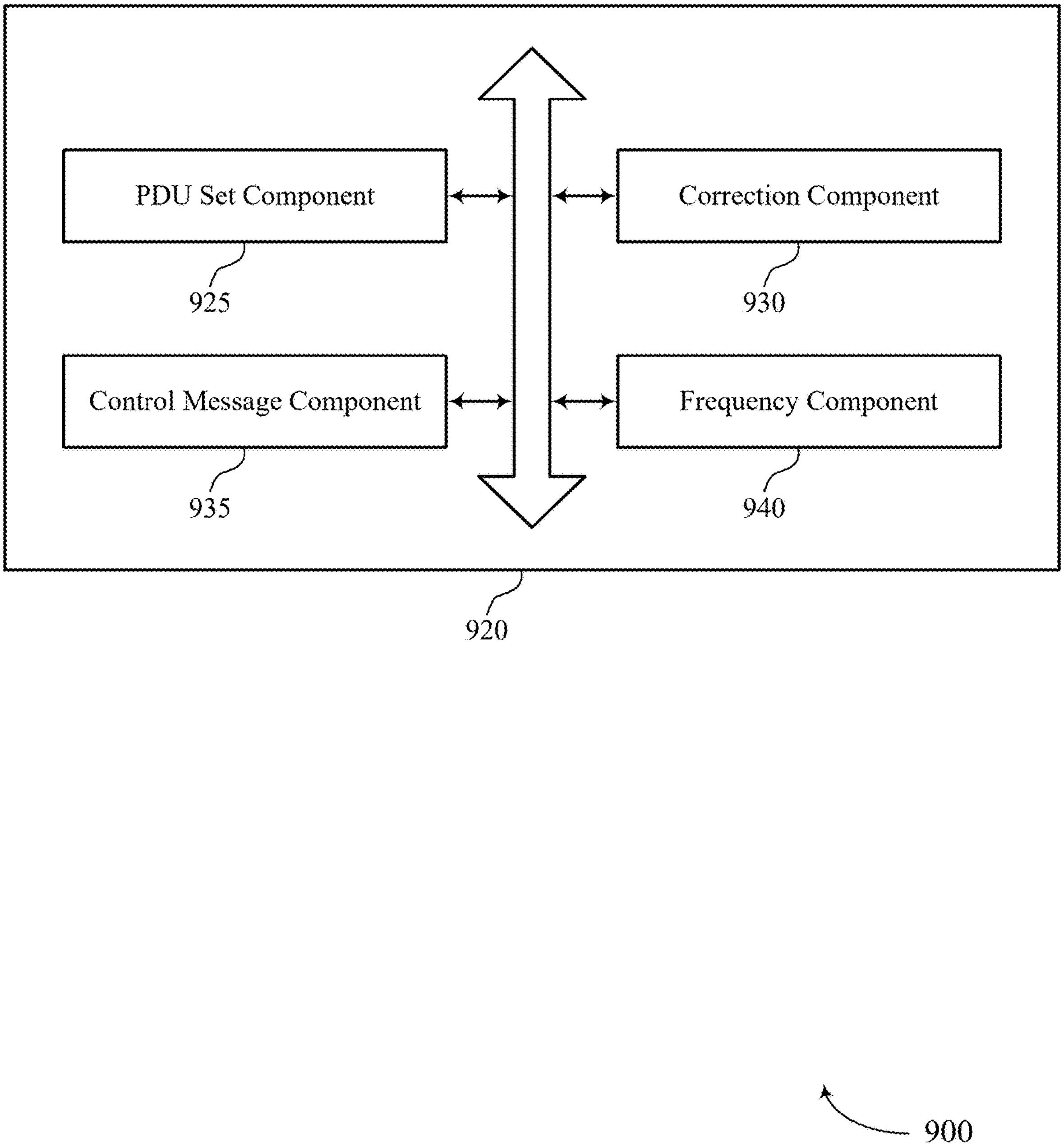
FIG. 9 shows a block diagram of a communications manager that supports PSSize correction in accordance with one or more aspects of the present disclosure.

FIG. 9 shows a block diagram 900 of a communications manager 920 that supports PSSize correction in accordance with one or more aspects of the present disclosure. The communications manager 920 may be an example of aspects of a communications manager 720, a communications manager 820, or both, as described herein. The communications manager 920, or various components thereof, may be an example of means for performing various aspects of PSSize correction as described herein. For example, the communications manager 920 may include a PDU set component 925, a correction component 930, a control message component 935, a frequency component 940, or any combination thereof. Each of these components, or components or sub-components thereof (e.g., one or more processors, one or more memories), may communicate, directly or indirectly, with one another (e.g., via one or more buses).

The communications manager 920 may support wireless communication in accordance with examples as disclosed herein. The PDU set component 925 is capable of, configured to, or operable to support a means for receiving a set of multiple packets of a PDU set, one or more packets of the set of multiple packets indicating a first PSSize of the PDU set. The correction component 930 is capable of, configured to, or operable to support a means for calculating, based on reception of the set of multiple packets, a second PSSize for the set of multiple packets of the PDU set and a correction parameter associated with the first PSSize, the correction parameter based on the first PSSize and the second PSSize. The control message component 935 is capable of, configured to, or operable to support a means for transmitting a control message indicating a quantized correction parameter associated with the first PSSize based on the correction parameter.

In some examples, the correction parameter indicates a conversion between the first PSSize and the second PSSize.

In some examples, the correction parameter includes a correction ratio that indicates a ratio of the second PSSize to the first PSSize.

In some examples, the correction parameter includes an error ratio that indicates a difference between a ratio of the second PSSize to the first PSSize and one.

In some examples, the frequency component 940 is capable of, configured to, or operable to support a means for receiving an indication of a frequency parameter associated with transmission of the control message that indicates the quantized correction parameter, where transmitting the control message is in accordance with the frequency parameter.

In some examples, to support transmitting the control message, the control message component 935 is capable of, configured to, or operable to support a means for transmitting the control message to a sender of the PDU set, to a network entity associated with the UE, or both.

In some examples, the control message includes a traffic flow identifier associated with the PDU set and an error range associated with the first PSSize, the error range indicating that the quantized correction parameter satisfies one or more threshold values.

In some examples, the control message includes a first field indicating an identifier of the PDU set or a time parameter associated with calculation of the second PSSize by the UE, a second field indicating the quantized correction parameter, a third field indicating at least a subset of a synchronization source identifier associated with a packet carrying the PDU set, or a combination thereof.

In some examples, to support transmitting the control message, the control message component 935 is capable of, configured to, or operable to support a means for transmitting a real time transport control protocol (RTCP) feedback message including a feedback control information field that indicates the quantized correction parameter.

In some examples, to support transmitting the control message, the control message component 935 is capable of, configured to, or operable to support a means for transmitting a real time transport control protocol (RTCP) application specific message including an application dependent data field that indicates the quantized correction parameter and including a name field that indicates a name associated with the quantized correction parameter.

In some examples, to support transmitting the control message, the control message component 935 is capable of, configured to, or operable to support a means for transmitting a real time transport control protocol (RTCP) extended report message including a type-specific block contents field that indicates the quantized correction parameter.

In some examples, to support transmitting the control message, the control message component 935 is capable of, configured to, or operable to support a means for transmitting a real time transport protocol (RTP) header extension including a field that indicates the quantized correction parameter.

Figure 10:
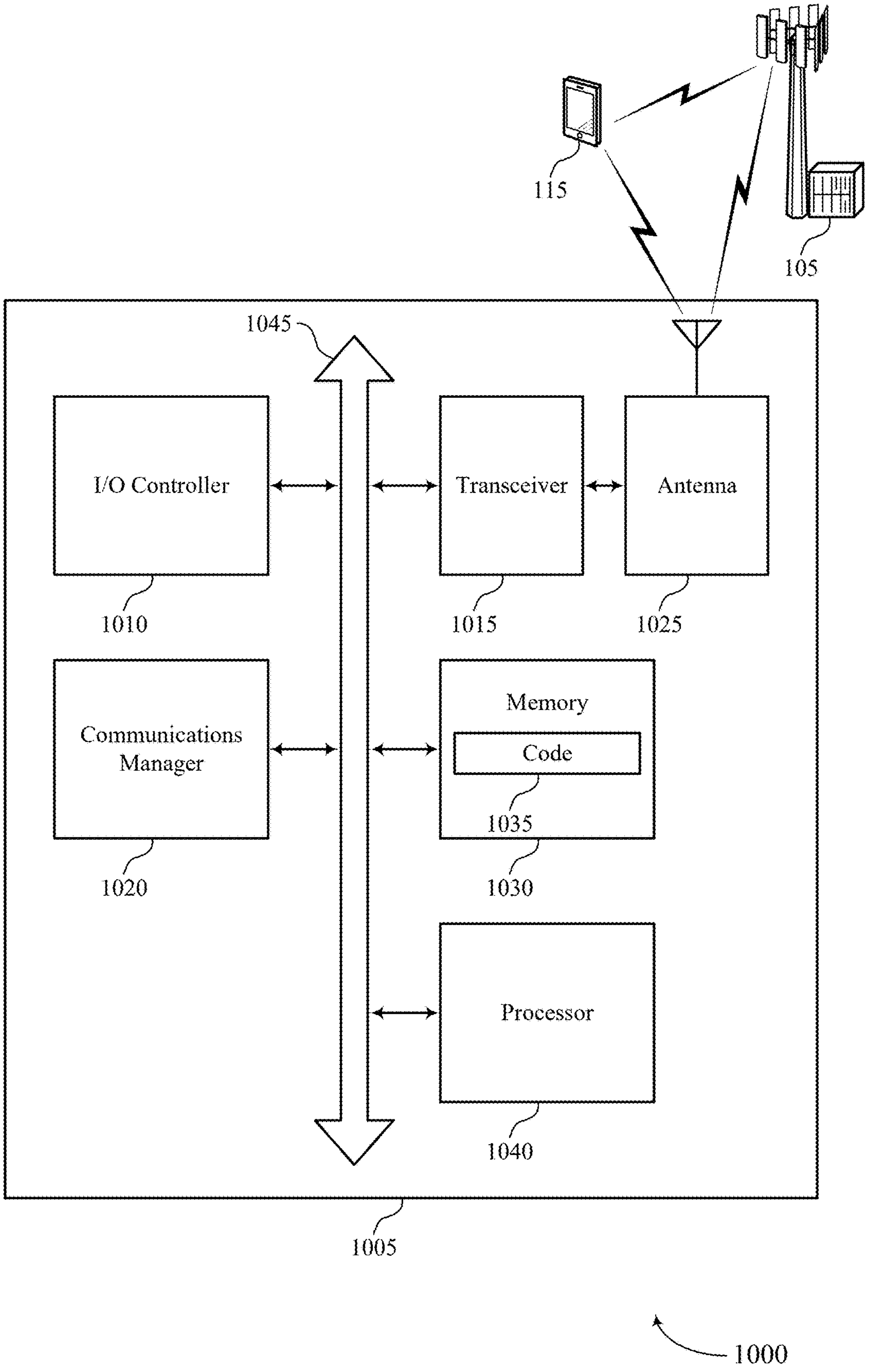
FIG. 10 shows a diagram of a system including a device that supports PSSize correction in accordance with one or more aspects of the present disclosure.

FIG. 10 shows a diagram of a system 1000 including a device 1005 that supports PSSize correction in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting PSSize correction). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communication in accordance with examples as disclosed herein. For example, the communications manager 1020 is capable of, configured to, or operable to support a means for receiving a set of multiple packets of a PDU set, one or more packets of the set of multiple packets indicating a first PSSize of the PDU set. The communications manager 1020 is capable of, configured to, or operable to support a means for calculating, based on reception of the set of multiple packets, a second PSSize for the set of multiple packets of the PDU set and a correction parameter associated with the first PSSize, the correction parameter based on the first PSSize and the second PSSize. The communications manager 1020 is capable of, configured to, or operable to support a means for transmitting a control message indicating a quantized correction parameter associated with the first PSSize based on the correction parameter.

By including or configuring the communications manager 1020 in accordance with examples as described herein, the device 1005 may support techniques for reduced latency, improved user experience related to reduced processing, and reduced power consumption.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of PSSize correction as described herein, or the at least one processor 1040 and the at least one memory 1030 may be otherwise configured to, individually or collectively, perform or support such operations.

Figure 11:
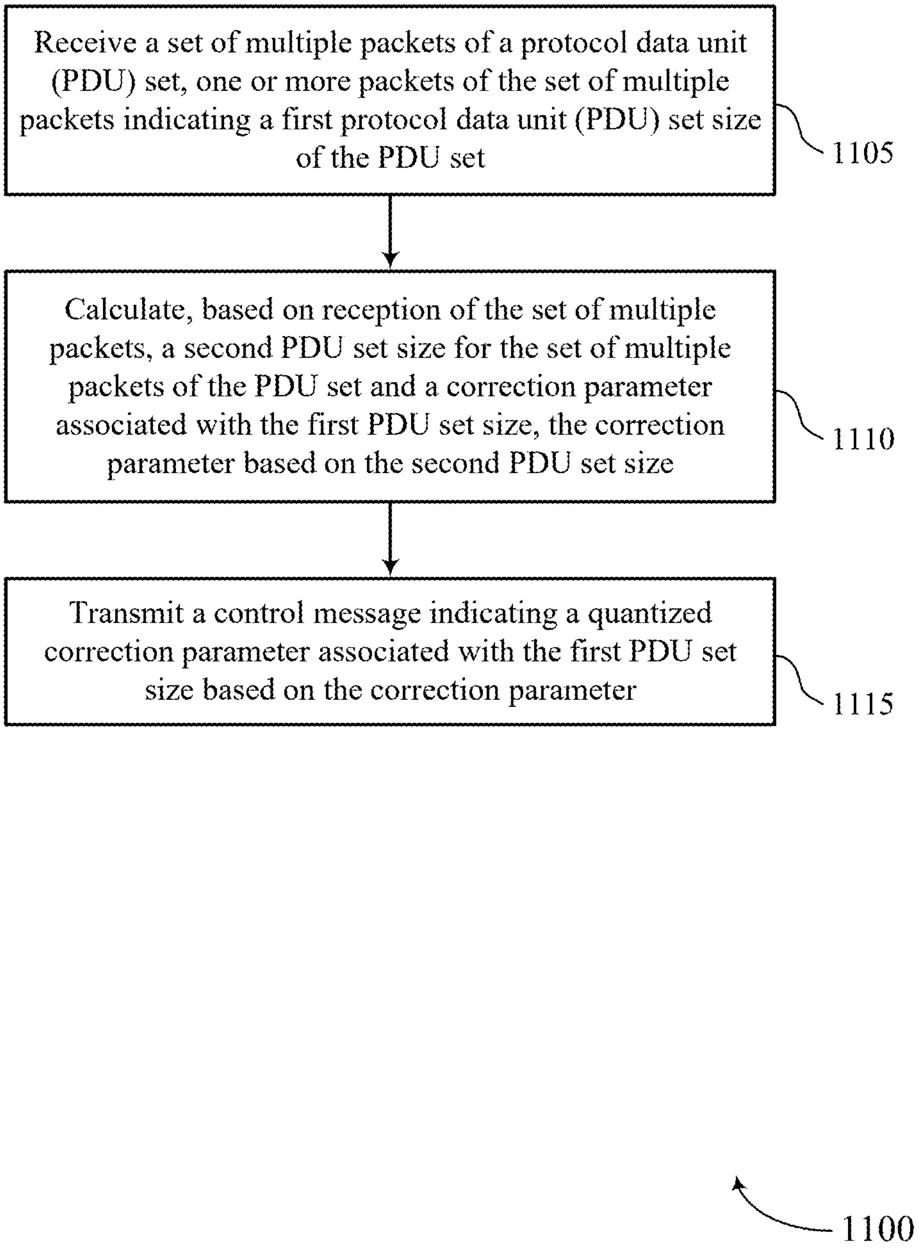
FIG. 11 shows a flowchart illustrating methods that support PSSize correction in accordance with one or more aspects of the present disclosure.

FIG. 11 shows a flowchart illustrating a method 1100 that supports PSSize correction in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving a set of multiple packets of a PDU set, one or more packets of the set of multiple packets indicating a first PSSize of the PDU set. The operations of 1105 may be performed in accordance with examples as disclosed herein. In some examples, aspects of the operations of 1105 may be performed by a PDU set component 925 as described with reference to FIG. 9.

At 1110, the method may include calculating, based on reception of the set of multiple packets, a second PSSize for the set of multiple packets of the PDU set and a correction parameter associated with the first PSSize, the correction parameter based on the first PSSize and the second PSSize. The operations of 1110 may be performed in accordance with examples as disclosed herein. In some examples, aspects of the operations of 1110 may be performed by a correction component 930 as described with reference to FIG. 9.

At 1115, the method may include transmitting a control message indicating a quantized correction parameter associated with the first PSSize based on the correction parameter. The operations of 1115 may be performed in accordance with examples as disclosed herein. In some examples, aspects of the operations of 1115 may be performed by a control message component 935 as described with reference to FIG. 9.

The following provides an overview of aspects of the present disclosure:

Aspect 1: A method for wireless communication by a UE, comprising: receiving a plurality of packets of a PDU set, one or more packets of the plurality of packets indicating a first PSSize of the PDU set; calculating, based at least in part on reception of the plurality of packets, a second PSSize for the plurality of packets of the PDU set and a correction parameter associated with the first PSSize, the correction parameter based at least in part on the first PSSize and the second PSSize; and transmitting a control message indicating a quantized correction parameter associated with the first PSSize based at least in part on the correction parameter.

Aspect 2: The method of aspect 1, wherein the correction parameter indicates a conversion between the first PSSize and the second PSSize.

Aspect 3: The method of any of aspects 1 through 2, wherein the correction parameter comprises a correction ratio that indicates a ratio of the second PSSize to the first PSSize.

Aspect 4: The method of any of aspects 1 through 3, wherein the correction parameter comprises an error ratio that indicates a difference between a ratio of the second PSSize to the first PSSize and one.

Aspect 5: The method of any of aspects 1 through 4, further comprising: receiving an indication of a frequency parameter associated with transmission of the control message that indicates the quantized correction parameter, wherein transmitting the control message is in accordance with the frequency parameter.

Aspect 6: The method of any of aspects 1 through 5, wherein transmitting the control message comprises: transmitting the control message to a sender of the PDU set, to a network entity associated with the UE, or both.

Aspect 7: The method of any of aspects 1 through 6, wherein the control message comprises a traffic flow identifier associated with the PDU set and an error range associated with the first PSSize, the error range indicating that the quantized correction parameter satisfies one or more threshold values.

Aspect 8: The method of any of aspects 1 through 7, wherein the control message comprises a first field indicating an identifier of the PDU set or a time parameter associated with calculation of the second PSSize by the UE, a second field indicating the quantized correction parameter, a third field indicating at least a subset of a synchronization source identifier associated with a packet carrying the PDU set, or a combination thereof.

Aspect 9: The method of any of aspects 1 through 8, wherein transmitting the control message comprises: transmitting a RTCP feedback message comprising a feedback control information field that indicates the quantized correction parameter.

Aspect 10: The method of any of aspects 1 through 9, wherein transmitting the control message comprises: transmitting a RTCP application specific message comprising an application dependent data field that indicates the quantized correction parameter and comprising a name field that indicates a name associated with the quantized correction parameter.

Aspect 11: The method of any of aspects 1 through 10, wherein transmitting the control message comprises: transmitting a RTCP extended report message comprising a type-specific block contents field that indicates the quantized correction parameter.

Aspect 12: The method of any of aspects 1 through 11, wherein transmitting the control message comprises: transmitting a RTP header extension comprising a field that indicates the quantized correction parameter.

Aspect 13: A UE for wireless communication, comprising one or more memories storing processor-executable code, and one or more processors coupled with the one or more memories and individually or collectively operable to execute the code to cause the UE to perform a method of any of aspects 1 through 12.

Aspect 14: A UE for wireless communication, comprising at least one means for performing a method of any of aspects 1 through 12.

Aspect 15: A non-transitory computer-readable medium storing code for wireless communication, the code comprising instructions executable by one or more processors to perform a method of any of aspects 1 through 12.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (WI-FI™), IEEE 802.16 (WIMAX™) IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non- transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and BLU-RAY™ disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a plurality of packets of a protocol data unit (PDU) set, one or more packets of the plurality of packets indicating a first PDU set size of the PDU set;

calculate, based at least in part on reception of the plurality of packets, a second PDU set size for the plurality of packets of the PDU set and a correction parameter associated with the first PDU set size, the correction parameter based at least in part on the first PDU set size and the second PDU set size; and transmit a control message indicating a quantized correction parameter associated with the first PDU set size based at least in part on the correction parameter, wherein the correction parameter comprises at least one of:

a correction ratio that indicates a ratio of the second PDU set size to the first PDU set size, or an error ratio that indicates a difference between a ratio of the second PDU set size to the first PDU set size and one.

2. The UE of claim 1, wherein the correction parameter indicates a conversion between the first PDU set size and the second PDU set size.

3. The UE of claim 1, wherein the correction parameter comprises the correction ratio that indicates the ratio of the second PDU set size to the first PDU set size.

4. The UE of claim 1, wherein the correction parameter comprises the error ratio that indicates the difference between the ratio of the second PDU set size to the first PDU set size and one.

5. The UE of claim 1, wherein the one or more processors are individually or collectively further operable to execute the code to cause the UE to:

receive an indication of a frequency parameter associated with transmission of the control message that indicates the quantized correction parameter, wherein transmitting the control message is in accordance with the frequency parameter.

6. The UE of claim 1, wherein, to transmit the control message, the one or more processors are individually or collectively operable to execute the code to cause the UE to:

transmit the control message to a sender of the PDU set, to a network entity associated with the UE, or both.

7. The UE of claim 1, wherein the control message comprises a traffic flow identifier associated with the PDU set and an error range associated with the first PDU set size, the error range indicating that the quantized correction parameter satisfies one or more threshold values.

8. The UE of claim 1, wherein the control message comprises a first field indicating an identifier of the PDU set or a time parameter associated with calculation of the second PDU set size by the UE, a second field indicating the quantized correction parameter, a third field indicating at least a subset of a synchronization source identifier associated with a packet carrying the PDU set, or a combination thereof.

9. The UE of claim 1, wherein, to transmit the control message, the one or more processors are individually or collectively operable to execute the code to cause the UE to:

transmit a real time transport control protocol (RTCP) feedback message comprising a feedback control information field that indicates the quantized correction parameter.

10. The UE of claim 1, wherein, to transmit the control message, the one or more processors are individually or collectively operable to execute the code to cause the UE to:

transmit a real time transport control protocol (RTCP) application specific message comprising an application dependent data field that indicates the quantized correction parameter and comprising a name field that indicates a name associated with the quantized correction parameter.

11. The UE of claim 1, wherein, to transmit the control message, the one or more processors are individually or collectively operable to execute the code to cause the UE to:

transmit a real time transport control protocol (RTCP) extended report message comprising a type-specific block contents field that indicates the quantized correction parameter.

12. The UE of claim 1, wherein, to transmit the control message, the one or more processors are individually or collectively operable to execute the code to cause the UE to:

transmit a real time transport protocol (RTP) header extension comprising a field that indicates the quantized correction parameter.

13. A method for wireless communication by a user equipment (UE), comprising:

receiving a plurality of packets of a protocol data unit (PDU) set, one or more packets of the plurality of packets indicating a first protocol data unit (PDU) set size of the PDU set;

calculating, based at least in part on reception of the plurality of packets, a second PDU set size for the plurality of packets of the PDU set and a correction parameter associated with the first PDU set size, the correction parameter based at least in part on the first PDU set size and the second PDU set size; and transmitting a control message indicating a quantized correction parameter associated with the first PDU set size based at least in part on the correction parameter, wherein the control message comprises a traffic flow identifier associated with the PDU set and an error range associated with the first PDU set size, the error range indicating that the quantized correction parameter satisfies one or more threshold values.

14. The method of claim 13, wherein the correction parameter indicates a conversion between the first PDU set size and the second PDU set size.

15. The method of claim 13, wherein the correction parameter comprises a correction ratio that indicates a ratio of the second PDU set size to the first PDU set size.

16. The method of claim 13, wherein the correction parameter comprises an error ratio that indicates a difference between a ratio of the second PDU set size to the first PDU set size and one.

17. The method of claim 13, further comprising:

receiving an indication of a frequency parameter associated with transmission of the control message that indicates the quantized correction parameter, wherein transmitting the control message is in accordance with the frequency parameter.

18. The method of claim 13, wherein transmitting the control message comprises:

transmitting the control message to a sender of the PDU set, to a network entity associated with the UE, or both.

19. A user equipment (UE), comprising:

one or more memories storing processor-executable code; and one or more processors coupled with the one or more memories and individually or collectively operable to execute the code to cause the UE to:

receive a plurality of packets of a protocol data unit (PDU) set, one or more packets of the plurality of packets indicating a first PDU set size of the PDU set;

calculate, based at least in part on reception of the plurality of packets, a second PDU set size for the plurality of packets of the PDU set and a correction parameter associated with the first PDU set size, the correction parameter based at least in part on the first PDU set size and the second PDU set size; and transmit a control message indicating a quantized correction parameter associated with the first PDU set size based at least in part on the correction parameter, wherein, to transmit the control message, the one or more processors are individually or collectively operable to execute the code to cause the UE to transmit a real time transport control protocol (RTCP) feedback message comprising at least one of:

a feedback control information field that indicates the quantized correction parameter, an application dependent data field that indicates the quantized correction parameter and a name field that indicates a name associated with the quantized correction parameter, or a type-specific block contents field that indicates the quantized correction parameter.

* * * * *